UNITED STATES PATENT OFFICE.

HENRY B. HOVLAND, OF DULUTH, AND GEORGE B. FRANKFORTER, OF MINNEAPOLIS, MINNESOTA.

ART OF TREATING METALLIFEROUS MATERIALS.

1,098,668.     Specification of Letters Patent.     Patented June 2, 1914.

No Drawing.     Application filed December 12, 1913. Serial No. 806,310.

*To all whom it may concern:*

Be it known that we, HENRY B. HOVLAND and GEORGE B. FRANKFORTER, citizens of the United States, residing at Duluth, St. Louis county, and Minneapolis, Hennepin county, Minnesota, respectively, have invented certain new and useful Improvements in the Art of Treating Metalliferous Materials; and we do hereby declare the following to be a full, clear, and exact description of the invention, such as will enable others skilled in the art to which it appertains to make and use the same.

This invention relates to the art of treating metalliferous materials, such as ores, concentrates, slags, flue-dust, tailings, slimes, slime-concentrates, and other residues or wastes from principal or preparatory operations in the metallurgical arts, and any other materials carrying free metals or metal compounds, to fit them for extracting the metals therefrom.

In particular, it has reference to sulfidizing the metals contained in such materials, thereby adapting the said materials for undergoing the process of flotation, a process of selection or concentration which in recent years, has been used for separating metalliferous materials from the gangue, or from each other, or for fitting such materials to other ways of separation.

We have made the discovery that dry hydrogen-sulfid gas will readily and quickly sulfidize metallic copper and its oxids, carbonates, silicates and other salts of copper and other metals and their compounds, when reacting on them in a dry condition. Moreover, we have found in the course of our experiments and researches in this direction that this sulfidizing action proceeds more rapidly than when these materials are treated with hydrogen sulfid in water solution. We have also found that sulfids produced in this way respond more readily to methods of separation and recovery than native sulfids. Based on this discovery, we have devised a process which is applicable to the sulfidizing, preparatory to concentration, of a great variety of metalliferous materials which process comprises the features and steps hereinafter described and more particularly pointed out in the claims.

One example of proceeding under our invention is the treatment of copper ores.

We take a low grade silicious copper ore which contains from 1% to 2% of copper in non-sulfid form, that is to say, in a mixture of copper carbonates, copper silicates, copper oxids, some metallic copper being present. We take this ore carrying its natural moisture as mined, or exposed to the air, crush and grind it in the dry so that all will pass through a 60-mesh screen after which it is delivered in a continuous feed into a revolving drum inclined toward the discharge end and hydrogen sulfid gas is introduced with the ore. No external artificial heat is applied either to the drum, the gas or the ore. Thus an atmosphere of normally dry hydrogen sulfid gas at the ordinary atmospheric temperature and pressure is maintained in the drum in contact with the normally dry comminuted ore at the prevailing normal temperature. By slowly revolving the drum, the contact between the ore and the gas is facilitated and the completion of the reaction is hastened. It is not necessary for the comminuted ore to remain in its passage through the drum longer than about 10 to 20 minutes. During that time, if a sufficient supply of hydrogen sulfid gas is maintained, the particles of oxidized copper will either be coated with copper sulfid or will be completely changed to copper sulfid. In either event the end sought will have been attained. The drum is so adjusted in inclination and speed of rotation that the comminuted ore remains in the drum under the action of the hydrogen-sulfid gas a sufficient length of time for the completion of the required reaction and no longer. No artificial heat from external sources is applied either to the ore, the gas or the drum. The discharge end of the drum revolves in a stationary hood, the lower part of which opens into a hopper or bin supplied at the bottom with proper chutes for drawing off the ore, either into ore cars, or onto a carrying belt. The hopper or bin is maintained practically full and in this condition it prevents the escape of gas downward. The excess of hydrogen sulfid gas passes through the drum over the ore in the hopper and out through a discharge pipe, leading out of the hood, which pipe returns the excess of gas to the original supply tank of hydrogen-sulfid gas. The passage of comminuted ore through the drum is continuous. The copper contents of the ore when treated in this manner will be found to be sulfidized and amenable to methods of recovery by flotation or other concentration methods. Therefore the still dry comminuted ore may be immediately transported from the hopper to the concentration apparatus there to undergo the process of separation.

If, on account of disagreeable dust from dry fine grinding, it is found preferable in practice on certain ores to rough crush the material only down to say the size of peas, or even larger, such coarse ore material may be treated in a drum as above described with hydrogen-sulfid gas in the same manner as above with the exception that the action of the hydrogen sufid gas must be allowed a longer time and that the material is passed through and from the drum at a considerably slower rate, so that the gas will have sufficient time to penetrate the largest pieces to the core. But in the case of handling very large tonnages of such material it is preferable to inclose the same in large closed bins arranged as chambers for maintaining a constantly replenished atmosphere of hydrogen sulfid gas in contact with the coarsely crushed material a sufficient length of time until the largest pieces have been sufidized to the core. Fresh crushed ore is constantly added through openings properly protected against escape of gas at the top of the bins while coarse sufficiently sulfidized material is drawn off from the bottom of the bins in any suitable way, then passed through wet fine grinding machinery to obviate the creation of dust incident to fine dry grinding. After the same has been thus ground it is ready to undergo the separating or concentrating process.

In ores where a part of the total copper content is in the form of copper-sulfid and the remainder is in the form of oxidized copper, copper-carbonate, copper-silicates and sometimes finely divided metallic copper, under the concentration methods as usually employed for the recovery of the copper sulfids, the oxidized forms of copper and finely divided metal for the most part have passed into the tailings and have been lost, thereby reducing the net recovery of copper. By the above preliminary hydrogen-sulfid gas treatment the oxidized and metallic remainder of the copper-ore is also made available by being first transformed into copper-sulfid.

This invention is also applicable to sulfidizing copper-bearing materials and deposits *in situ*. Thus, for example, in many mining districts there are large deposits of sulfid ores which are overlaid by a heavy capping carrying varying amounts of copper, usually in the non-sulfid form, that is to say, a material of the kind spoken of in the above example, in the form of oxids, silicates and carbonates, but in some cases also some finely divided metal. These deposits have heretofore not been susceptible of profitable treatment. By this invention these deposits may be made available either by removing and treating the material essentially as seen in the example given or by sulfidizing them *in situ*. In the latter case the hydrogen-sulfid gas is delivered into the mass of the capping through drill-holes or other openings, the hydrogen-sulfid gas being supplied to the openings or drill-holes as fast as it is absorbed by the mass of the capping. The action of hydrogen sulfid gas on dry or comparatively dry metalliferous material follows the laws of diffusion of gases and accordingly penetrates such materials much more rapidly than it does in the case of its water solution. Invariably, capping as described is fractured to a greater or less extent and these fractures have a tendency to gather and carry a proportionately large percentage of the prevailing valuable minerals or compounds. In the case of the treatment of capping *in situ*, the fractures offer more favorable passages for hydrogen sulfid gas than the solid portions, and it follows that any metal or its compound lodged along the fractures are, in general, first acted upon by the hydrogen-sulfid gas, and these fracture passages become a distributing network for the entrance of the hydrogen-sulfid gas into the more solid unfractured portion of the metalliferous materials. A very important result of such action of hydrogen-sulfid in capping is a disintegration and loosening of the entire material, thereby lessening the expenses of mining and subsequent crushing operations. A further indirect advantage from such utilization and removal of the capping lies in the resulting exposure of underlying sulfid ore bodies, permitting of the less expensive methods of surface mining. In order to maintain the openings or drill holes always filled with the hydrogen-sulfid gas while the gas is being absorbed by the capping, and to facilitate the distribution of gas throughout the mass of the material, the said gas is delivered to said openings or drill holes under pressure.

We may also treat dumps of oxidized ores of tailings, or other residues or waste material may be treated by our process for the purpose of preparing them for extraction by metals, by building inexpensive low, practically gas-tight sheds over them, and introducing into and maintaining a hydrogen sulfid gas atmosphere over the metalliferous material in such sheds a sufficient length of time to penetrate the lumps as well as finer material, thereby transforming the metal compounds or free metal contained therein to sulfids, which are then released by crushing and fine grinding, and recovered in concentration.

As another example illustrating our invention, the treatment of materials containing lead is mentioned. For example, we may treat lead ores containing carbonate of lead, or tailings containing such carbonate with hydrogen-sulfid gas. When such materials in a solid, that is to say a substantially dry condition, are treated with hydrogen-sulfid gas in the manner above described for copper-containing materials, at ordinary temperature, that is to say, without the intervention of external artificial heat, the reaction is energetic and the time required for complete conversion is governed by the rate of supply of hydrogen sulfid gas. The lead materials so converted can then readily be separated from the gangue by flotation or other concentrating methods.

Our invention is distinguished from former methods of sulfidizing by the fact that under it substantially dry metalliferous materials, under which term we mean to include materials in a solid form, either in the condition in which they are found or exist in nature, or containing only as much moisture as consistent with a solid state, or in an absolutely dried or desiccated form, as contradistinguished from a pulp, slush or solution of such materials, are subjected to the action of hydrogen-sulfid gas. Moreover, under our invention hydrogen-sulfid gas acts without the application of external heat or, in other words, at ordinary temperatures, although heat may be applied without departing from the spirit of our invention or heat may be developed by the reaction of the hydrogen sulfid gas which, broadly considered, comprises the reaction of hydrogen sulfid gas on metalliferous materials in solid form.

The hydrogen sulfid gas, which may be supplied at or above atmospheric pressure, may, for purposes of our invention, be completely dry or carry an amount of moisture not interfering with its gaseous state. It may also be mixed with another gas or gases, or vapor or vapors, so long as they will permit the sulfidizing action of the hydrogen-sulfid gas, and such mixtures are to be understood as included in the claims when speaking of the reaction of hydrogen-sulfid gas on the metalliferous materials.

In the case of a copper sulfid ore body the principal value of which is in the form of chalcocite, $Cu_2S$, there are present almost invariably in the ore body other forms of copper usually copper-carbonates, oxids and silicates. The chalcocite particles are at times coated with a film of the oxids and at times oxidized forms of copper are found within said particles of chalcocite. Most of this oxidized copper has been lost in methods of concentration heretofore employed. By our treatment of such ore any oxidized forms of copper on the surface of chalcocite particles are changed in place to sulfid and a layer of $CuS$ is formed on the surface of such chalcocite particles thereby enhancing their responsiveness to methods of recovery. Besides this the $Cu_2S$ itself of the chalcocite in contact with hydrogen-sulfid gas changes to a higher sulfid, the reaction proceeding slowly from the surface of the particles inward so that a coating of higher sulfid is formed on the surface of the chalcocite particles, whether oxidized forms of copper be present or not and the particles whose surfaces are so changed similarly lend themselves more readily to flotation or other methods of concentration. A further effect of such reaction at the surface of chalcocite particles is to loosen them from any inclosing gangue. In an atmosphere of hydrogen-sulfid in time the entire mass of the particle of chalcocite will be transformed to a higher sulfid. So that summarized, if sulfid ore, such as described, be treated with hydrogen sulfid-gas all of the metallic and oxidized forms of copper in the ore will be transformed to the sulfid form and the particles of chalcocite will have formed upon their surfaces a coating of the higher sulfid and, in general, all of the copper contents of such an ore will more readily respond to concentration methods.

Under our invention it is also possible to treat flue-dust from copper smelting or from other copper extraction plants, thereby rendering an extremely troublesome material available. When treating such flue-dust it is subjected to essentially the same operation as in the case of comminuted ore as above described.

What we claim and desire to secure by Letters Patent of the United States is:

1. The process which consists in reacting on a substantially dry metalliferous material with a substantially dry gaseous sulfidizing agent at ordinary temperature.

2. The process which consists in reacting on substantially dry metalliferous materials with a substantially dry sulfidizing agent in the absence of exterior artificial heat.

3. The process which consists in reacting on a copper containing material with a sulfidizing agent in the dry at ordinary temperature.

4. The process which consists in reacting on substantially dry metalliferous materials with hydrogen-sulfid gas.

5. The process which consists in reacting on substantially dry metalliferous materials with hydrogen-sulfid gas in the absence of exterior artificial heat.

6. The process which consists in reacting on substantially dry copper bearing material with hydrogen sulfid gas.

7. The process which consists in reacting on substantially dry copper ores with hydrogen-sulfid gas in the absence of exterior artificial heat.

8. The process which consists in reacting on substantially dry materials containing free metallic copper with a sulfidizing gas.

9. The process of sulfidizing capping or other metalliferous materials *in situ*, which consists in delivering a sulfidizing gas into openings in said materials until the materials are sufficiently sulfidized, fresh supplies of gas being delivered as the old supplies are absorbed.

In testimony whereof we hereunto affix our signature in the presence of two witnesses.

HENRY B. HOVLAND.
GEORGE B. FRANKFORTER.

Witnesses for Henry B. Hovland:
SUE M. KERSTEIN,
IDA R. HAMAKER.

Witnesses for George B. Frankforter:
K. W. OLIVER,
WM. METHLEY.